US008808613B1

(12) United States Patent
Yamayose

(10) Patent No.: US 8,808,613 B1
(45) Date of Patent: Aug. 19, 2014

(54) METHOD FOR MANUFACTURING ALUMINUM-TITANATE-BASED CERAMIC HONEYCOMB STRUCTURE

(71) Applicant: Ibiden Co., Ltd., Ogaki (JP)

(72) Inventor: Kazunori Yamayose, Stuttgart (DE)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/887,688

(22) Filed: May 6, 2013

Related U.S. Application Data

(60) Provisional application No. 61/787,500, filed on Mar. 15, 2013.

(51) Int. Cl.
C04B 35/478 (2006.01)
C04B 38/00 (2006.01)

(52) U.S. Cl.
CPC ............................. *C04B 38/0006* (2013.01)
USPC .......................................... 264/630; 264/631

(58) Field of Classification Search
USPC .................................................. 264/630, 631
See application file for complete search history.

(56) References Cited

U.S. PATENT DOCUMENTS

| | | | | | |
|---|---|---|---|---|---|
| 3,904,352 | A | * | 9/1975 | Thurnauer et al. ................. | 432/5 |
| 4,293,514 | A | * | 10/1981 | Wada ............................. | 264/630 |
| 4,786,542 | A | * | 11/1988 | Yasuda et al. .................... | 428/116 |
| 6,352,669 | B1 | * | 3/2002 | Cooper et al. .................... | 264/608 |
| 6,447,712 | B1 | * | 9/2002 | Dogan et al. ..................... | 264/608 |
| 6,599,463 | B2 | * | 7/2003 | Miyazaki et al. ................ | 264/614 |
| 6,669,892 | B2 | * | 12/2003 | Ganguli et al. ................... | 264/621 |
| 6,808,577 | B2 | * | 10/2004 | Miyazaki et al. ............. | 156/89.12 |
| 7,497,983 | B2 | * | 3/2009 | Khan et al. ...................... | 264/673 |
| 7,611,560 | B2 | * | 11/2009 | Ichikawa ........................... | 55/523 |
| 2001/0006451 | A1 | * | 7/2001 | Miyazaki et al. ............ | 361/321.2 |
| 2001/0010617 | A1 | * | 8/2001 | Miyazaki et al. ............ | 361/321.2 |
| 2005/0082648 | A1 | * | 4/2005 | Naito et al. ...................... | 257/678 |
| 2007/0001349 | A1 | * | 1/2007 | Muroi et al. .................... | 264/605 |

(Continued)

FOREIGN PATENT DOCUMENTS

| | | |
|---|---|---|
| JP | 06-47499 B | 6/1994 |
| JP | 2005-219977 | 8/2005 |

OTHER PUBLICATIONS

U.S. Appl. No. 13/887,638, filed May 6, 2013, Yamayose.
U.S. Appl. No. 13/872,483, filed Apr. 29, 2013, Yamayose.

(Continued)

*Primary Examiner* — Joseph S Del Sole
*Assistant Examiner* — Russell Kemmerle, III
(74) *Attorney, Agent, or Firm* — Oblon, Spivak, McClelland, Maier & Neustadt, L.L.P.

(57) ABSTRACT

A method for manufacturing a ceramic honeycomb structure includes kneading titania particles, alumina particles and binder ingredient such that raw material paste including the titania particles, alumina particles and binder ingredient is prepared, forming a body made of the raw material paste and having a honeycomb structure such that the body has the honeycomb structure having multiple through-holes extending in the longitudinal direction of the body and multiple partition portions formed between the through-holes, positioning on a base having granules the body made of the raw material paste and having the honeycomb structure such that the granules are interposed between the body and the base, and sintering the body made of the raw material paste and having the honeycomb structure on the base with the granules interposed between the body and the base such that a ceramic body having the honeycomb structure is formed on the base with the granules.

16 Claims, 12 Drawing Sheets

(56) References Cited

U.S. PATENT DOCUMENTS

| | | | |
|---|---|---|---|
| 2008/0206561 A1* | 8/2008 | Yokoyama et al. | 428/402 |
| 2009/0008830 A1* | 1/2009 | Okazaki et al. | 264/442 |
| 2011/0127699 A1* | 6/2011 | Vayansky et al. | 264/630 |
| 2012/0013052 A1* | 1/2012 | Schumann | 264/629 |
| 2012/0133088 A1* | 5/2012 | Rhoads | 264/607 |
| 2012/0198805 A1* | 8/2012 | Iwasaki et al. | 55/523 |

OTHER PUBLICATIONS

U.S. Appl. No. 13/873,576, filed Apr. 30, 2013, Yamayose.
U.S. Appl. No. 13/873,379, filed Apr. 30, 2013, Yamayose.
U.S. Appl. No. 13/873,624, filed Apr. 30, 2013, Yamayose.
U.S. Appl. No. 13/873,763, filed Apr. 30, 2013, Yamayose.
U.S. Appl. No. 13/873,933, filed Apr. 30, 2013, Yamayose.

* cited by examiner

Cross-sectional view at line (A-A)

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,500, filed Mar. 15, 2013, the entire contents of which are incorporated herein by reference.

BACKGROUND OF THE INVENTION

1. Field of the Invention

The present invention relates to a method for manufacturing an aluminum-titanate-based ceramic honeycomb structural body. More specifically, in the method for manufacturing an aluminum-titanate-based ceramic honeycomb structural body, a body is sintered while positioned on a base.

2. Description of Background Art

In methods for manufacturing a ceramic honeycomb structural body described in Japanese Laid-Open Patent Publication No. 2005-219977 and Examined Patent Publication H6-47499, a body is sintered using a setter plate called a firing setter between a base and a honeycomb body. The entire contents of these publications are incorporated herein by reference.

SUMMARY OF THE INVENTION

According to one aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partition portions formed between the through-holes, positioning on a base having granules the body made of the raw material paste and having the honeycomb structure such that the granules are interposed between the body and the base, and sintering the body made of the raw material paste and having the honeycomb structure on the base with the granules interposed between the body and the base such that a ceramic body having the honeycomb structure is formed on the base with the granules.

Another aspect of the present invention is a ceramic honeycomb structural body produced by a method for manufacturing a ceramic honeycomb structure including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partition portions formed between the through-holes, positioning on a base having granules the body made of the raw material paste and having the honeycomb structure such that the granules are interposed between the body and the base, and sintering the body made of the raw material paste and having the honeycomb structure on the base with the granules interposed between the body and the base such that a ceramic body having the honeycomb structure is formed on the base with the granules.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
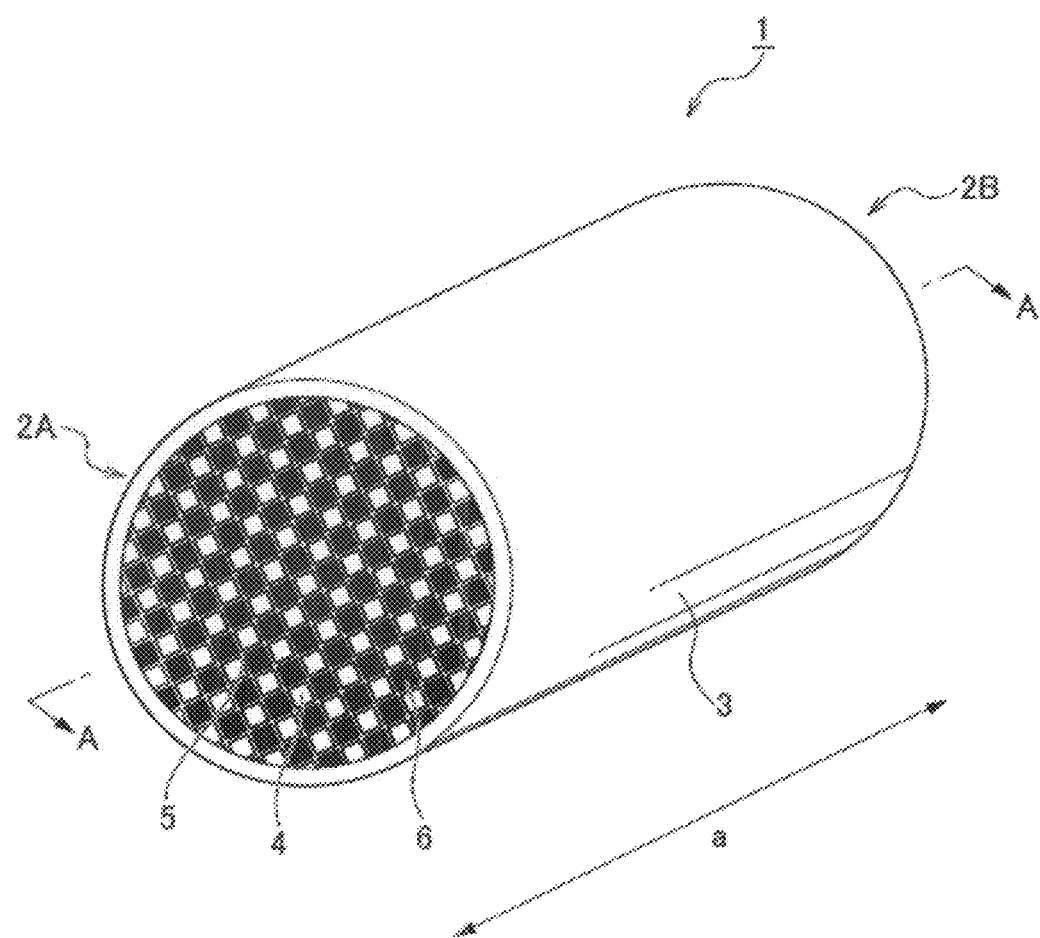
FIG. 1 is a perspective view schematically showing an example of a ceramic honeycomb structural body obtained by a manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic honeycomb structural body obtained by a manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in a longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealing pattern. The shape of ceramic body 1 may also be an elliptic cylinder, a rectangular prism or a polygonal prism instead of a circular cylinder as shown in FIG. 1.

Figure 2:
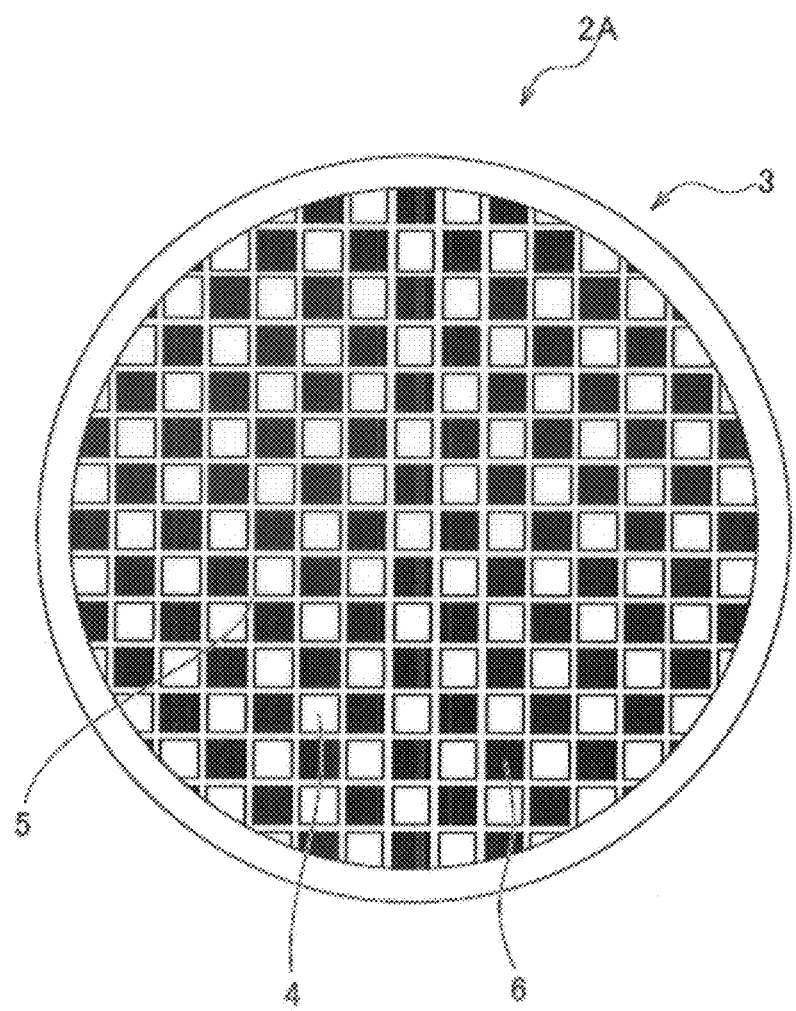
FIG. 2 is a view showing an end surface of the ceramic honeycomb structural body shown in FIG. 1.

FIG. 2 is a view showing an end surface of ceramic honeycomb structural body 1 shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
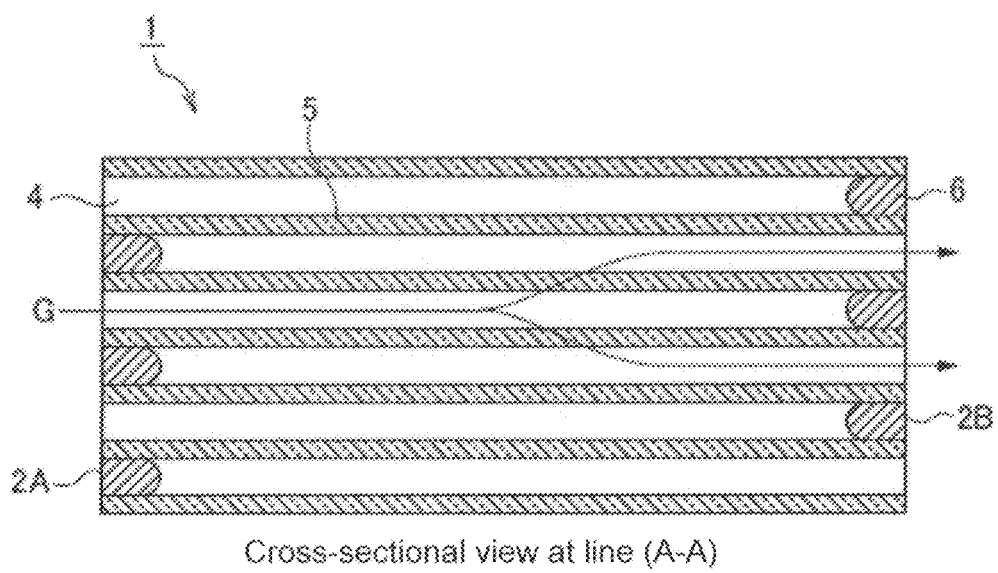
FIG. 3 is a cross-sectional view at line (A-A) of the ceramic honeycomb structural body shown in FIG. 1.

FIG. 3 is a cross-sectional view at line (A-A) of the ceramic honeycomb structural body shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic honeycomb structural body 1 according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to an embodiment of the present invention.

Figure 4:
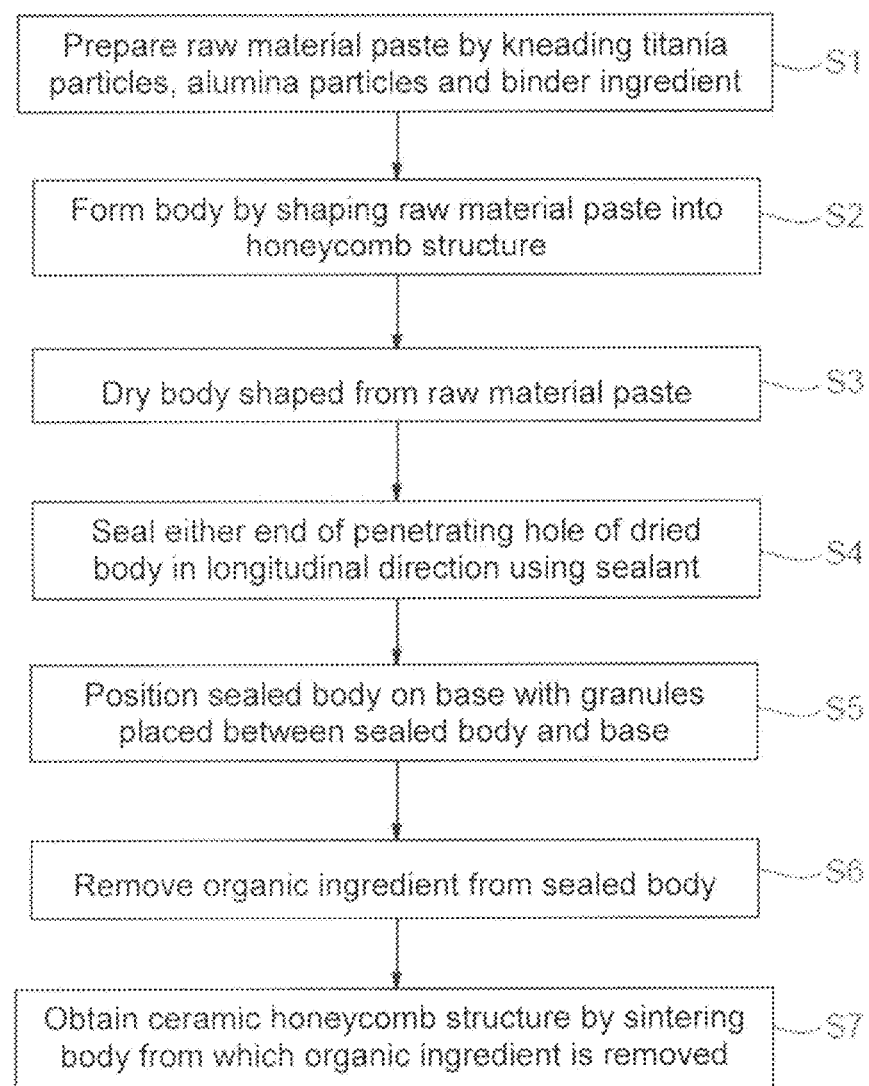
FIG. 4 is a flowchart showing an example of the manufacturing method according to an embodiment of the present invention.

FIG. 4 is a flowchart showing an example of the method for manufacturing a honeycomb structure according to an embodiment of the present invention.

An example of the method for manufacturing a ceramic honeycomb structure as shown in FIG. 4 includes the following: preparation step (S1) for preparing raw material paste by kneading titania particles, alumina particles and a binder ingredient; forming step (S2) to form a body by shaping the raw material paste into a honeycomb structure; drying step (S3) for drying the body shaped from the raw material paste; sealing step (S4) for sealing either end in a longitudinal direction of a through-hole of the dried body using a sealant; positioning step (S5) for positioning a sealed body on a base by placing granules between the sealed body and the base; degreasing step (S6) for removing organic ingredients from the sealed body; and sintering step (S7) to obtain a ceramic honeycomb structure by sintering the body after the organic ingredients are removed.

However, it is an option not to conduct drying step (S3), sealing step (S4) and degreasing step (S5) in the method for manufacturing a ceramic honeycomb structure. Namely, it is an option to conduct preparation step (S1) for preparing raw material paste by kneading titania particles, alumina particles and a binder ingredient, forming step (S2) to form a body by shaping the raw material paste into a honeycomb structure, and positioning step (S5) for positioning the body on a base while granules are between the body and the base, and then to conduct sintering step (S7) to obtain a ceramic-honeycomb structure by directly sintering the body formed by the above steps.

Here, positioning step (S5) may be conducted between degreasing step (S6) and sintering step (S7).

Also, sealing step (S4) may be conducted either after forming step (S2) or after sintering step (S7).

In the following, each step is described.

Preparation of Raw Material Paste (S1)

In a preparation step, raw material paste is prepared by kneading titania particles, alumina particles and a binder ingredient. Raw material paste may also be prepared by adding mullite particles and a binder ingredient to titania particles and alumina particles and by kneading them in a preparation step.

In the present application, titania particles indicate those containing only titania, and alumina particles indicate those containing only alumina. Mullite particles mean particles formed with alumina and silicon dioxide. Here, titania particles, alumina particles and mullite particles may also contain impurities. As for impurities, for example, silicon (Si), aluminum (Al), iron (Fe), calcium (Ca), magnesium (Mg), potassium (K), sodium (Na) and the like are listed.

A method for kneading particles and a binder ingredient is not limited specifically, and a mixer, a kneader, a media mixing mill (attritor), a pressure kneader (muller) or the like may be used for kneading.

Titania particles and alumina particles may be used as is, or may be slurried using a dispersion medium such as water. Alternatively, mixed particles of titania particles and alumina particles may be used as described later. Mullite particles may also be added to titania particles and alumina particles.

As for titania particles and alumina particles used in a preparation step, it is an option for titania particles and alumina particles in a precursor to be combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. An amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum of alumina (amount of substance of alumina) derived from alumina particles and alumina derived from mullite particles. Accordingly, when mullite particles are used in a preparation step, it is preferred to combine mullite particles with titania particles and alumina particles in an amount-of-substance ratio of titania to alumina that is within the above range.

When titania particles and alumina particles are combined in a preparation step or a preconditioning treatment step, their weight ratio is, for example, in a range of 35:65~55:45, more preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

When alumina particles and titania particles having a particle diameter greater than that of alumina particles are used, it may be referred to as a "first mode" in the following. In addition, when alumina particles and titania particles having a particle diameter smaller than that of alumina particles are used, it is referred to as a "second mode" and described below. Moreover, when alumina particles and titania particles having a particle diameter substantially the same as that of alumina particles are used, it is referred to as a "third mode" and described below.

As for the particle diameter of titania particles in the first mode, the mean volume particle diameter is 5 μm~20 μm, for example. Also, particles with a mean volume particle diameter of 8 μm~18 μm or the like may be used. Titania particles here may be primary particles, secondary particles that are aggregate primary particles, or a combination thereof.

In the present application, mean volume particle diameters are measured using a laser diffraction particle size distribution analyzer (Beckman Coulter Inc.).

As for the particle diameter of alumina particles in the first mode, the mean volume particle diameter is 2 μm~5 μm, for example.

In the present application, the type of alumina particles is not limited specifically. For example, α-alumina particles, γ-alumina particles, a combination of α-alumina particles and γ-alumina particles, or the like may be used. In addition, alumina particles may be primary particles, secondary particles that are aggregate primary particles, or a combination thereof.

In the first mode, the ratio of particle diameters of titania particles to alumina particles is not limited specifically, and it may be in a range of 10:1-10:3, for example.

A second mode is described in the following, using alumina particles and titania particles having a smaller particle diameter than that of alumina particles.

As for the particle diameter of titania particles in the second mode, the mean volume particle diameter is 0.1 μm~0.8 μm or 0.2 μm~0.5 μm, for example.

As for the particle diameter of alumina particles in the second mode, the mean volume particle diameter is 2 μm~5 μm, for example.

In the second mode, the ratio of particle diameters of titania particles to alumina particles is not limited specifically, and it may be in a range of 1:4~1:10, for example.

In addition, a third mode is described using titania particles and alumina particles having substantially the same particle diameters as each other.

As for the particle diameter of titania particles in the third mode, the mean volume particle diameter is 1 μm~5 μm or 1 μm~3 μm, for example.

As for the particle diameter of alumina particles in the third mode, the mean volume particle diameter is 2 μm~5 μm, for example.

In the third mode, the ratio of particle diameters of titania particles to alumina particles is not limited specifically, and it may be in a range of 1.0:0.3~1:4, for example.

As for the particle diameter of mullite particles to be used in addition to titania particles and alumina particles if needed, the mean volume particle diameter is 0.1 μm~45 μm, for example. Alternatively, a mean volume particle diameter of 0.1 μm~20 μm, 0.5 μm~10 μm and so forth, for example, may also be used. When a body is sintered and aluminum titanate is produced, unreacted aluminum and silicon contained in mullite particles are thought to melt and work as a binder which fills spaces in aluminum titanate.

The mullite particles may be primary particles, secondary particles that are aggregate primary particles, or a combination thereof.

As for titania particles used for a precursor in the present embodiment, the powder of titania particles (titania powder) may include impurities such as silicon (Si), aluminum (Al), iron (Fe), calcium (Ca), magnesium (Mg), potassium (K) and sodium (Na). In the present application, "titania powder" means bulk (material, raw material) of titania particles to be used in a method for manufacturing a ceramic honeycomb structure. Here, impurities in titania powder may be such that are contained inevitably during a process for manufacturing titania, or may be such that are mixed into titania powder separately. In addition to impurities that make solid solutions with titania particles, other impurities that are present outside titania particles of titania powder may also be included.

It is thought that those impurities contribute to suppressing the decomposition of aluminum titanate, which is made from titania particles and alumina particles, into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing synthesized titania by using acids, alkalis or the like.

The amount of iron in titania powder is preferred to be at a weight ratio of 200 ppm~1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from decomposing to titania and alumina in a high temperature range.

The amount of silicon contained in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Si^{4+}$ is suppressed from decomposing to titania and alumina in a high temperature range.

Magnesium is preferred not to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought MgO may cause cracking due to expansion from moisture absorption. Thus, the amount of magnesium in titania powder is preferred to be within the above range. Alternatively, it is preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering aids for sinter-bonding aluminum titanate particles to each other so as to suppress cracking at particle boundaries among aluminum titanate particles. Thus, the amounts of potassium and sodium in titania powder are preferred to be in the above ranges.

Specifically, mixed particles of titania particles and alumina particles or mixed particles of titania particles, alumina particles and mullite particles are prepared by the following preconditioning treatment step.

Preconditioning Treatment

Titania particles and alumina particles are brought into contact and adhered to each other to form a precursor (a particle contact body of titania particles and alumina particles) in a preconditioning treatment step. Accordingly, a precursor is obtained where titania particles and alumina particles are homogenized and brought into contact with each other.

In a preconditioning treatment step, a precursor may also be formed by further adding a sintering aid to bring it into contact with titania particles and alumina particles (particle contact body of titania particles, alumina particles and a sintering aid). As for sintering aids, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. As described above, an amount-of-substance ratio here means a ratio of the amount of substance of titania to the amount of substance of alumina, not a ratio of the amount of substance of titania particles to the amount of substance of alumina particles. Therefore, when mullite particles or the like are used when forming a precursor, an amount-of-substance ratio of titania to alumina is obtained based on the sum of alumina (amount of substance of alumina) derived from alumina particles and alumina derived from mullite particles.

In the above-described first mode, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed in an oscillating granulator and then put into a rolling motion to prepare a precursor; titania particles and water are placed in an oscillating granulator and put into a rolling motion, then alumina particles are added to the oscillating granulator and put into a rolling motion so that a precursor is prepared; and so forth. In such cases, a ratio of 5%~10% by mass of water based on the entire mass of titania particles is used. Moreover, it is an option to use a binder ingredient (such as methylcellulose) along with water. A ratio of 5%~10% by mass of a binder ingredient based on the entire mass of titania particles may be used.

As for a method in which titania particles are immersed in an aqueous dispersion of alumina particles, for example, alumina particles are dispersed in a dispersion medium such as water to form an aqueous dispersion of alumina particles, titania particles are immersed in the aqueous dispersion of alumina particles, and then a precursor, in which titania particles and alumina particles are homogenized and in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

By conducting a preconditioning treatment step and by using alumina particles and titania particles having a greater particle diameter than that of alumina particles in the first mode, it is easier to form a precursor where multiple alumina particles are in contact with the surface of a titania particle.

In the above-described second mode, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of titania particles is formed by dispersing titania particles in a dispersion medium such as water, and then alumina particles are immersed in the aqueous dispersion of titania particles; or a method in which a mixture of titania particles and alumina particles is slurried and then dried while being mixed. As for a method in which titania particles and alumina particles are granulated through a rolling motion, for example, alumina particles and water are placed in an oscillating granulator and put into a rolling motion, then titania particles are added to the oscillating granulator and put into a motion to prepare a precursor.

By conducting a preconditioning treatment step in the second mode, it is easier to form a precursor where titania particles are in contact with the surface of an alumina particle.

To bring titania particles and alumina particles into contact with each other in the third mode, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed.

By conducting a preconditioning treatment step using alumina particles and titania particles having substantially the same particle diameter as alumina particles in the third mode, it is easier to form a mixture of a precursor where multiple alumina particles are in contact with the surface of a titania particle and a precursor where multiple titania particles are in contact with the surface of an alumina particle.

In a preconditioning treatment step, an obtained precursor is not sintered directly after the preconditioning treatment step. That makes it easier to form particles of a precursor to have a uniform diameter, while a precursor and a binder ingredient are kneaded in a short period of time.

By doing such a preconditioning treatment step, titania particles and alumina particles are more likely to be brought into contact with each other. Accordingly, precursor 7 is formed, where alumina particles 9 make contact with titania particle 8 to cover its surface, for example (FIG. 6).

Figure 5:
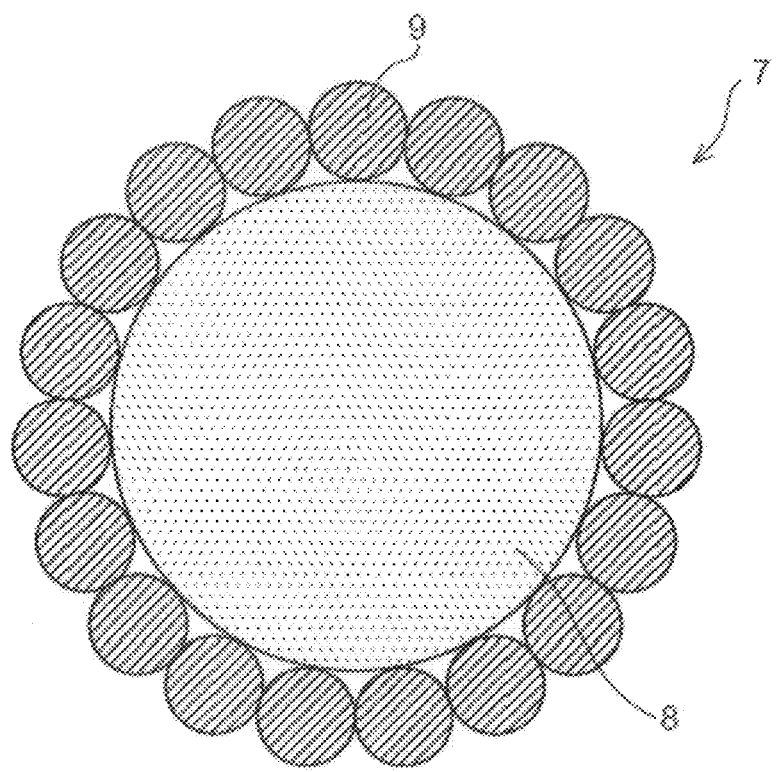
FIG. 5 is a view schematically showing an example of titania particles and alumina particles.
Figure 6:
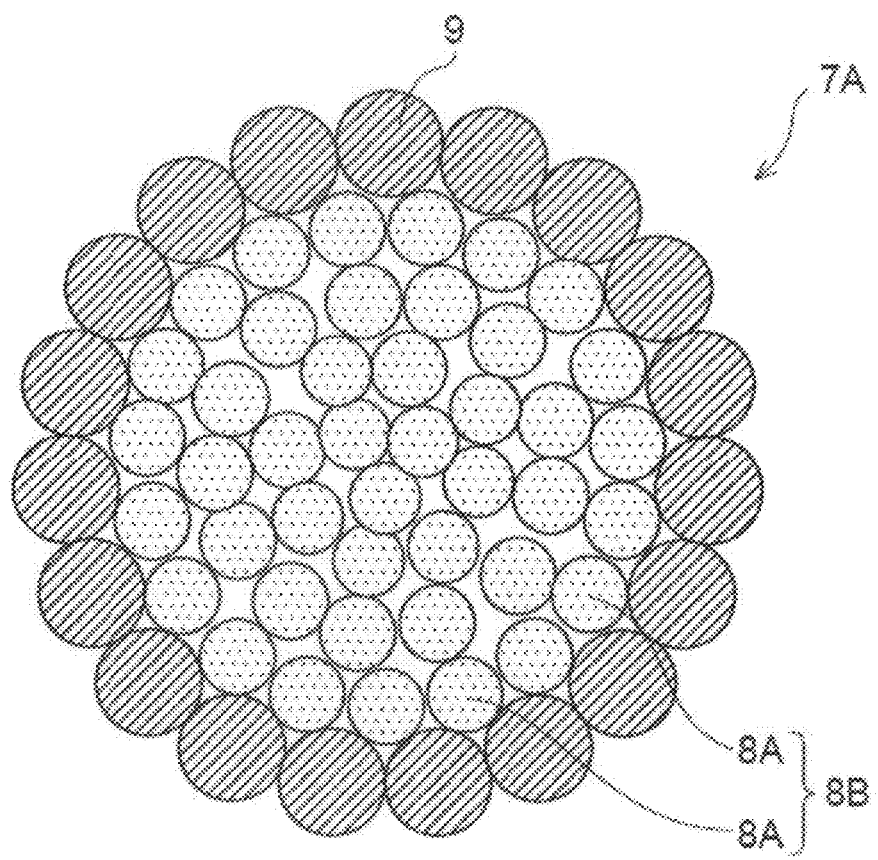
FIG. 6 is a view schematically showing another example of a precursor made of titania particles and alumina particles.

FIG. 6 shows a state where titania particle 8 is covered with alumina particles 9. That is an example of a precursor. Here, the state of a precursor is not limited to such a size relationship between titania particles and alumina particles as shown in FIG. 5, and another state may be employed, where the size of alumina particles is greater than that of titania particles and the surface of an alumina particle is covered with titania particles. In addition, yet another state may be employed, where the size of titania particles is substantially the same as that of alumina particles.

Also, when an aggregate of primary particles is used for titania particles, titania particles and alumina particles are more likely to be brought into contact with each other by performing a preconditioning treatment step such as described above. For example, as shown in FIG. 6, a precursor (7A) is formed, where titania particles (secondary particles) (8B) that are aggregate titania particles (primary particles) (8A) are covered with alumina particles 9.

In the present application, a "precursor" means a granular substance where titania particles and alumina particles are brought into contact and adhered to each other.

When titania particles, alumina particles and mullite particles are brought into contact and adhered to each other, a precursor (a particle contact body of titania particles, alumina particles and mullite particles) is formed by the same methods described above for bringing titania particles and alumina particles into contact with each other.

To bring titania particles, alumina particles and mullite particles into contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed.

As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass, for example.

As for dispersing agents, the following, for example, are listed: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass, for example.

As for solvents, the following are listed, for example: alcohols such as methanol, ethanol, butanol and propanol; glycols such as propylene glycol, polypropylene glycol and ethylene glycol; water; and the like.

The amount of a solvent to be used is 0.1%~50% by mass. It may be 10%~40% by mass, for example.

Forming of Honeycomb Structural Body (S2)

A body is formed by shaping the raw material paste into a honeycomb structure in a forming step.

To shape raw material paste is not limited specifically, and extrusion using a honeycomb die is employed, for example.

Drying of Body Shaped from Raw Material Paste (S3)

In a drying step, a body made by shaping the raw material paste is dried.

Dryers for a drying step are not limited to any specific type, and the following are listed: microwave dryers, hot-air dryers, dielectric heating dryers, reduced-pressure dryers, vacuum dryers, freeze dryers and the like.

The duration and temperature for drying are set appropriately according to the volume or the like of a honeycomb body shaped from the raw material paste.

Sealing of Through-Holes (S4)

In a sealing step, either end of a through-hole of the dried body in a longitudinal direction is sealed using a sealant.

Application of a sealant to a honeycomb body is not limited specifically. There are methods such as immersing an end surface of a body into sealant slurry, injecting a sealant into a through-hole from an end surface using an injector, and the like.

As for a sealant, it is not limited to any specific type. For example, raw material paste made of titania particles and alumina particles, or made of other ceramic, may be used.

Sealant slurry is prepared by adding a binder ingredient, water or the like to titania particles and alumina particles, for example. The viscosity of sealant slurry is adjusted properly according to the type and the like of the sealant.

Positioning of Body on Base (S5)

In a positioning step, a body is positioned on a base with granules between the body and the base. A body is positioned in a way that a longitudinal direction of the body corresponds to a vertical direction. Namely, a body is positioned vertically so that an end surface of the body in a longitudinal direction faces a main surface of the base (the surface on which the body is positioned), and granules are placed between the end surface of the body in a longitudinal direction and the main surface of the base. Granules may be placed as is between the body and the base, or may be contained in resin film as described later.

In the following, a positioning step is described, where granules are placed to make contact with a body and a base (namely, only granules are placed between the body and the base) in a degreasing step and a sintering step.

Positioning of Body on Base According to First Embodiment

A positioning step according to a first embodiment is described in detail.

Figure 7:
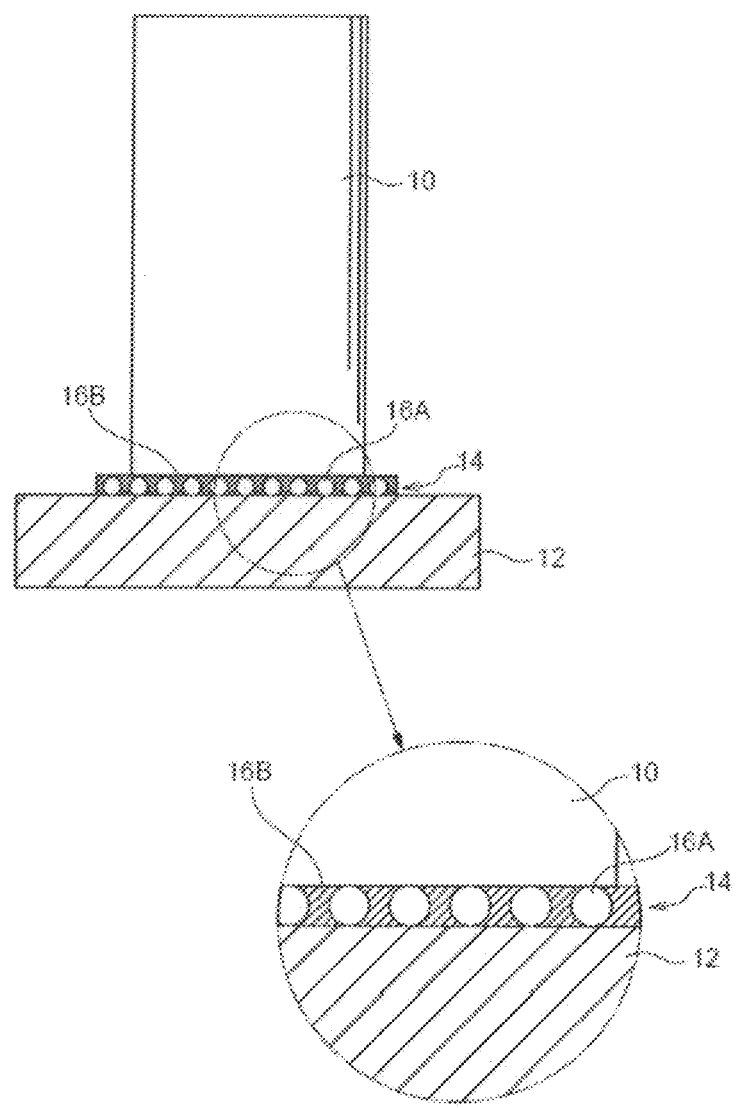
FIG. 7 is a view schematically illustrating a positioning step according to a first embodiment of the present invention.

FIG. 7 is a view schematically illustrating a positioning step according to a first embodiment of the present invention.

In a positioning step of the first embodiment, body 10 is positioned on base 12 while resin sheet 14 (an example of an organic sheet) containing granules (16A) is placed between body 10 and base 12 as shown in FIG. 7, for example.

Specifically, for example, resin sheet 14 containing granules (16A) is put on base 12 in a positioning step of the first embodiment. Then, body 10 is positioned vertically on resin sheet 14. In the positioning step of the first embodiment, organic sheet 14 may be pasted on an end surface of body 10 in a longitudinal direction, and then body 10 with the pasted sheet is positioned vertically on base 12.

In the positioning step of the first embodiment, the resin ingredients of resin sheet 14 will be burned by the heat during a subsequent degreasing step, and only granules (16A) remain. Then, a degreasing step and a sintering step are conducted with remaining granules (16A) existing between base 12 and body 10. However, when a positioning step is conducted between a degreasing step and a sintering step, or when a degreasing step is skipped, the resin ingredients of resin sheet 14 are burned by the heat during a sintering step so that the sintering step is conducted with the remaining granules existing between base 12 and body 10.

In the positioning step of the first embodiment, body 10 is positioned on base 12 with resin sheet 14 containing granules (16A) in between. Accordingly, it is advantageous when conducting degreasing and sintering steps, since more granules are present between base 12 and body 10.

Figure 8:
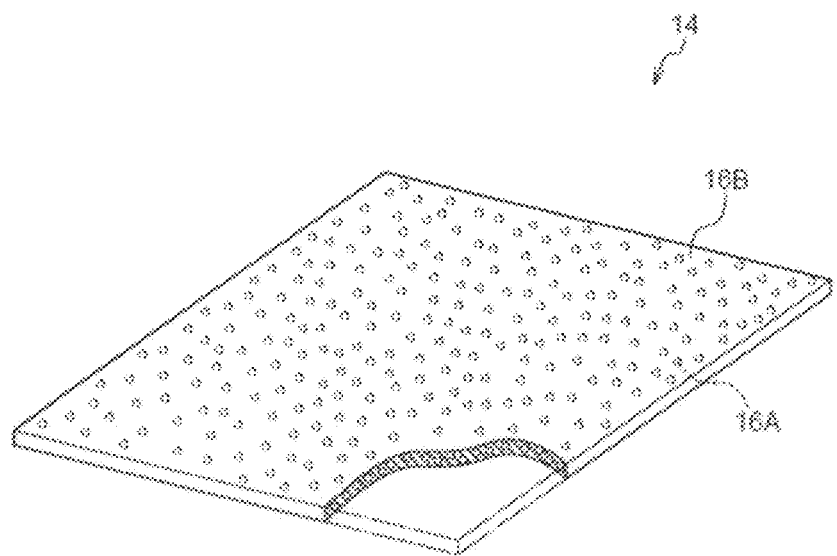
FIG. 8 is a perspective view showing an example of a resin sheet to be used in the positioning step according to a first embodiment of the present invention.

FIG. 8 is a perspective view showing an example of a resin sheet to be used in a positioning step according to a first embodiment of the present invention.

As shown in FIG. 8, a rectangular sheet in which granules (16A) are dispersed in resin (16B), for example, is used as resin sheet 14 containing granules (16A).

Resin (16B) is selected from among such resins that will be burned by the heat during a degreasing step. However, when a positioning step is conducted between a degreasing step and a sintering step, or when a degreasing step is skipped, resin (16B) is selected from among those to be burned by the heat during a sintering step.

As for resin (16B), for example, acryl, polycarbonate, polyethylene terephthalate, polyacetal, polyimide, polyamideimide, Teflon or the like is listed. Among those, acryl, polyethylene terephthalate and polyimide are preferred as resin (16B). Also, a paper sheet containing granules (16A) (another example of an organic sheet) may be used instead of resin sheet 14.

Granules (16A) are selected from heat-tolerant particles that will remain without being burned by the heat during degreasing and sintering steps.

As for granules (16A), inorganic particles such as zirconia, alumina, silica, ceria and titania are listed. Among those, zirconia particles are preferred for the granules.

The amount of granules (16A) in resin (16B) is 20 wt. %~70 wt. %, 30 wt. %~60 wt. %, or the like, for example.

The mean volume particle diameter of granules (16A) is 25 μm~500 μm, 50 μm~400 μm, 100 μm~300 μm, or the like, for example. Laser diffraction technique (a laser diffractometer, Mastersizer 2000, Malvern Instruments, Ltd.) may be used to measure the mean volume particle diameter of granules (16A).

The mean volume particle diameter of granules (16A) is preferred to be greater than the mean pore diameter of a ceramic honeycomb structure to be obtained. That is to prevent granules from entering the pores of a ceramic honeycomb structure. The mean pore diameter of a ceramic honeycomb structure is preferred to be 10 μm~25 μm. Mean pore diameters of ceramic honeycomb structures are measured by a mercury porosimeter (contact angle=130°, surface tension=484 mN/m). From the same reasons, the mean volume particle diameter of granules is preferred to be greater than the mean pore diameter of body 10 before degreasing and sintering steps.

The thickness of resin sheet 14 is 100 μm~2000 μm, 300 μm~1000 μm, or the like, for example.

The shape of resin sheet 14 is not limited to being a rectangle, and it may be another polygon or a circle.

The area of resin sheet 14 (the area of a main surface) is preferred to be substantially the same as or greater than an end surface of body 10 in a longitudinal direction.

For each body 10, resin sheet 14 is placed between body 10 and base 12, for example. However, that is not the only option. For example, multiple bodies 10 may be positioned on a row of resin sheets 14 so that a resin sheet is placed between each body 10 and base 12.

Positioning of Body on Base According to Second Embodiment

Figure 9:
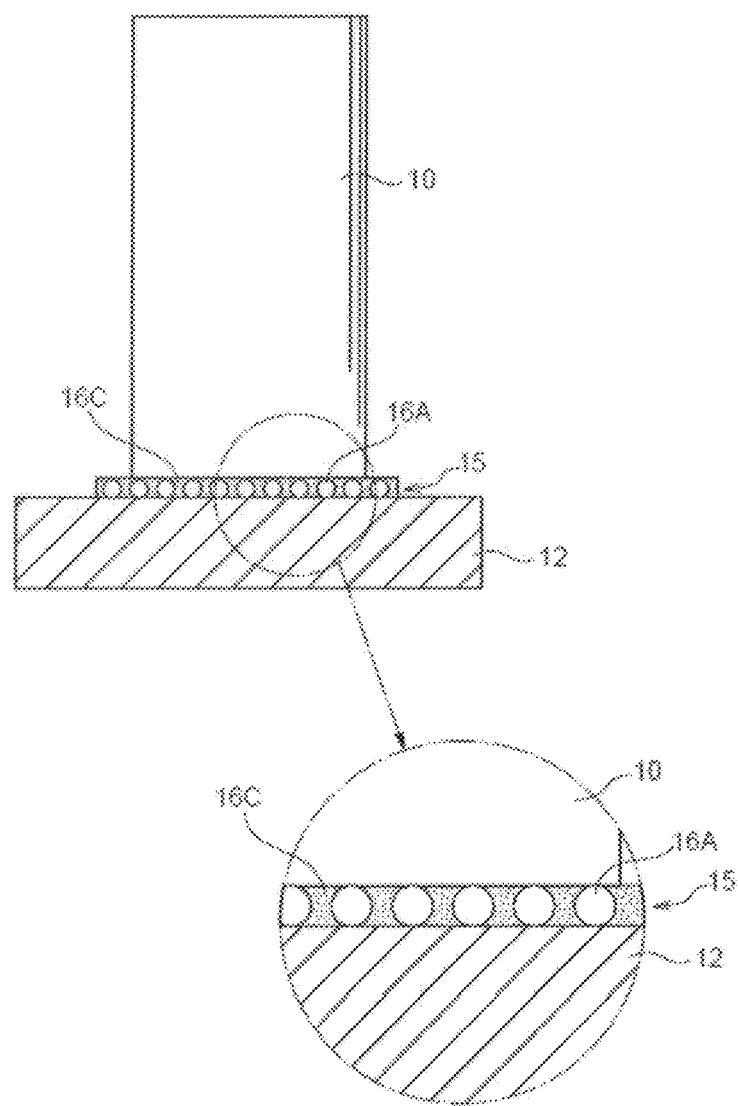
FIG. 9 is a view schematically illustrating a positioning step according to a second embodiment of the present invention.

FIG. 9 is a view schematically illustrating a positioning step according to a second embodiment of the present invention. The same reference number is assigned to a member in FIG. 9 when it is the same as that shown in FIG. 7.

In the positioning step of the second embodiment, body 10 is positioned on base 12 while paste 15 containing granules (16A) and liquid medium (16C) is placed between body 10 and base 12 as shown in FIG. 9.

Specifically, paste 15 containing granules (16A) and liquid medium (16C) is coated on base 12, for example, in the positioning step of the second embodiment. Then, body 10 is positioned vertically on the coated film of paste 15. In the positioning step of the second embodiment, it is an option to first coat paste 15 on an end surface of body 10 in a longitudinal direction, and then to position body 10 vertically on base 12.

In the positioning step of the second embodiment, body 10 is positioned on base 12 while paste 15 containing granules (16A) and liquid medium (16C) is present in between. Thus, it is also advantageous when conducting degreasing and sintering steps because more granules (16A) exist between base 12 and body 10.

In the positioning step of the second embodiment, liquid medium (16C) evaporates by the heat during a subsequent degreasing step and only granules (16A) remain in paste 15. Then, degreasing and sintering steps are conducted with remaining granules (16A) existing between base 12 and body 10. However, when a positioning step is conducted between a degreasing step and a sintering step, or when a degreasing step is skipped, liquid medium (16C) of paste 15 evaporates by the heat during a sintering step, and the sintering step is conducted with remaining granules (16A) existing between base 12 and body 10.

Here, paste 15 containing granules (16A) and liquid medium (16C) is a muddy liquid substance made by combining granules (16A) and a liquid medium.

As for liquid medium (16C), water, a volatile liquid medium (such as alcohol) or the like is listed. Among those, water is preferred for liquid medium (16C).

Granules described in the positioning step of the first embodiment may also be used for granules (16A).

The percentage of granules (16A) to liquid medium (16C) is 5 wt. %~70 wt. %, 10 wt. %~50 wt. %, or the like, for example.

The amount of paste 15 to be coated is 0.1 g/cm$^2$~1 g/cm$^2$, 0.2 g/cm$^2$~0.5 g/cm$^2$ or the like, for example.

It is preferred to coat paste 15 in a region on base 12 substantially the same as or greater than the region for positioning a body.

For each body 10, paste 15 is coated on base 12. However, that is not the only option, and multiple bodies 10 may be positioned on a strip of coated film of paste 15 so that paste 15 is placed between each body 10 and base 12.

A positioning step is not limited to those in the first and second embodiments. For example, granules (16A) may be positioned (spread, for example) on base 12 without anything else, and a body may be positioned on such granules (16A) (see FIG. 10).

Degreasing of Honeycomb Structural Body (S6)

Organic ingredients are removed from a sealed body in a degreasing step.

Figure 10:
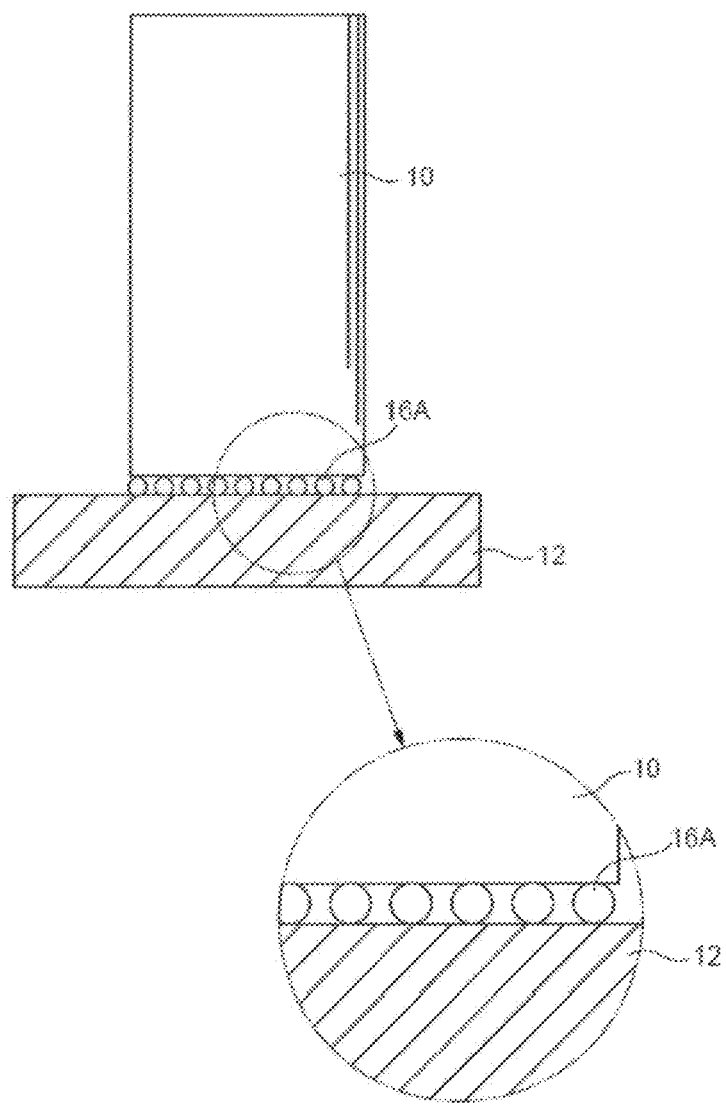
FIG. 10 is a view schematically showing an example in which granules are placed between a body and a base.

FIG. 10 is a view schematically showing an example where granules are placed between a body and a base. The same reference number used for a member in FIG. 7 is assigned to its counterpart in FIG. 10.

As shown in FIG. 10, since the resin of a resin sheet is burned or the liquid medium of a paste evaporates by the heat during a degreasing step as described in a positioning step, remaining granules (16A) are present between body 10 and base 12 in a degreasing step.

Then, organic ingredients are removed from sealed body 10 while granules (16A) are present between body 10 and base 12.

When granules (16A) are present between body 10 and base 12, frictional resistance is reduced between body 10 and base 12, and adhesion of body 10 to the surface of base 12 is suppressed. Therefore, in a degreasing step, contraction is less likely to be hindered at an end surface in a longitudinal direction of body 10 facing base 12. Namely, the difference in outer diameters at both ends of a sealed honeycomb structure in an axis direction is found to be smaller when the structure is heated in a degreasing step. As a result, the difference in outer diameters at both ends in an axis direction decreases in the obtained ceramic honeycomb structure.

Conditions to remove organic ingredients from a sealed honeycomb structure are not limited specifically, and may be appropriately selected depending on the type and amount of the organic substance contained in the honeycomb structure. For example, degreasing may be conducted at 150° C.~1000° C. for two hours, etc.

Sintering of Honeycomb Structural Body (S7)

In a sintering step, a ceramic honeycomb structure is obtained by sintering a body from which organic ingredients have been removed.

Specifically, a body from which organic ingredients have been removed is sintered in a sintering step while granules (16A) are placed between body 10 and base 12 as shown in FIG. 10.

When granules (16A) are placed between body 10 and base 12, frictional resistance is reduced between body 10 and base 12, and body 10 is suppressed from adhering to the surface of base 12. Therefore, at an end surface in a longitudinal direction of body 10 facing base 12, contraction is less likely to be hindered in a sintering step. Namely, the difference in outer diameters at both ends of a sealed honeycomb structure in an axis direction is found to be smaller when the structure is heated during a sintering step. As a result, the difference in outer diameters at both ends in an axis direction is reduced in the obtained ceramic honeycomb structure.

When a positioning step is conducted between a degreasing step and a sintering step, or when a degreasing step is skipped, since the resin of a resin sheet is burned, or the liquid medium of paste evaporates by the heat during a sintering step as described in a positioning step, the sintering step is conducted with remaining granules (16A) existing between body 10 and base 12.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, bodies may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and may be set at 1550° C. or lower.

The programming rate of the sintering temperature is not limited specifically, and may be set at 1° C./hour~500° C./hour, for example.

Sintering a honeycomb body is conducted under oxygen atmosphere such as atmospheric air, for example.

The duration for sintering a honeycomb body differs depending on the amount of raw material paste, the type of sintering furnace, the sintering temperature, the sintering atmosphere and the like. It may be set for 10 minutes-24 hours, for example.

Other Embodiment(s)

A method for manufacturing a ceramic honeycomb structure according to the embodiments of the present invention may also employ the following positioning step (a positioning step of another embodiment): an undegreased or unsintered ceramic setter is set on a base, granules are placed between a body and the setter, and the body is positioned on the base where the setter is placed.

Figure 11:
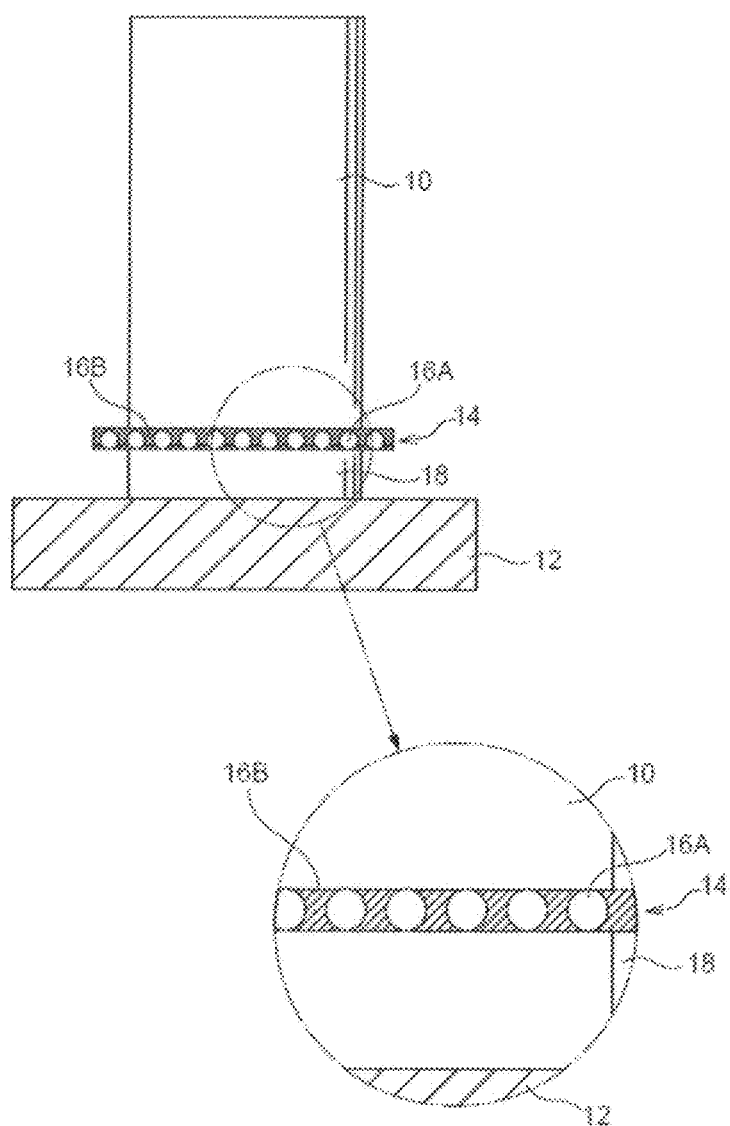
FIG. 11 is a view schematically illustrating a positioning step according to an embodiment of the present invention.
Figure 12:
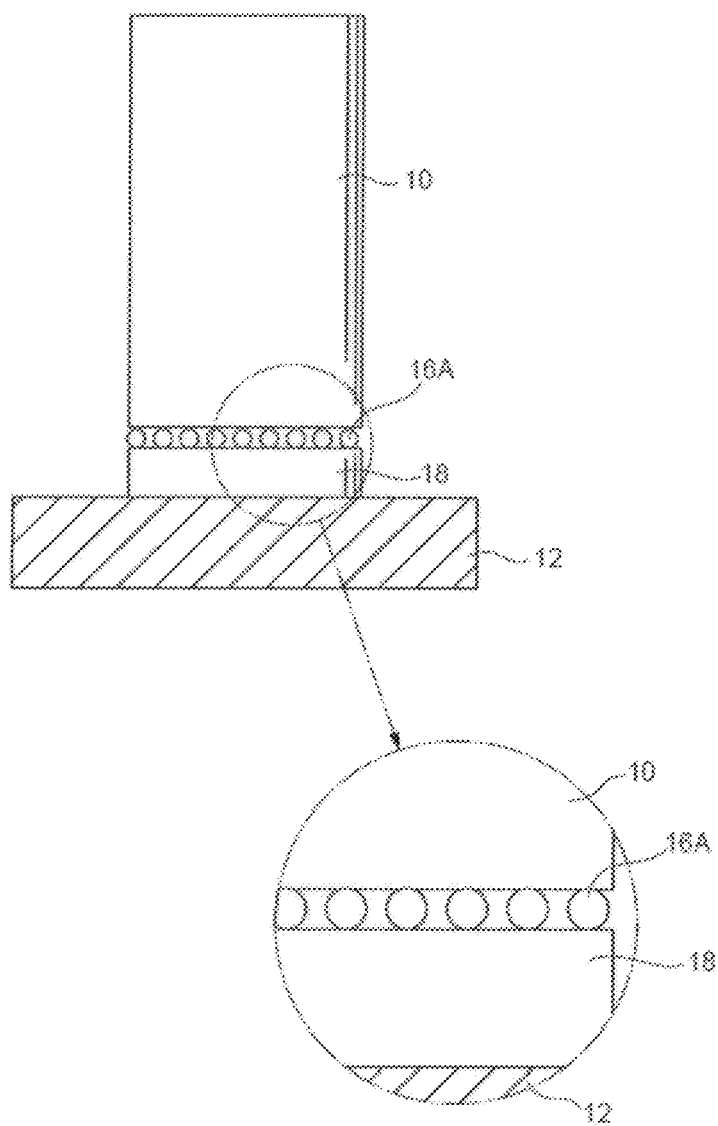
FIG. 12 is a view schematically illustrating an example in which granules are placed between a body and a base.

FIG. 11 is a view schematically illustrating a positioning step according to another embodiment of the present invention. FIG. 12 is a view schematically illustrating an example where granules are placed between a body and a setter. The same reference number used for a member in FIG. 7 is assigned to its counterpart in FIGS. 11 and 12.

In a positioning step of another embodiment, undegreased or unsintered ceramic setter 18 and resin sheet 14 containing granules (16A) are laminated on base 12 in that order as shown in FIG. 11, for example. Body 10 is positioned vertically on such laminated resin sheet 14. As for resin sheet 14, the same as that in a positioning step of the first embodiment is used.

Next, when a degreasing step is conducted, the resin in resin sheet 14 is burned by the heat during the degreasing step, leaving granules (16A) between body 10 and setter 18 as shown in FIG. 12. Namely, setter 18 and granules (16A) in that order on base 12 are placed between base 12 and body 10.

When a degreasing step and a sintering step are conducted while granules (16A) are placed between body 10 and setter 18, setter 18 contracts by heat simultaneously with the body since setter 18 is made of undegreased or unsintered ceramic. Accordingly, contraction is less likely to be hindered at an end surface of body 10 in a longitudinal direction facing setter 18.

Occasionally, contraction of body 10 may be hindered due to contraction difference between body 10 and setter 18. However, such contraction difference is less likely to cause problems for body 10 to contract, since frictional resistance is reduced between body 10 and setter 18, and adhesion of body 10 to the surface of setter 18 is suppressed because of granules (16A). As a result, the difference in outer diameters at both ends in an axis direction is reduced in the obtained ceramic honeycomb structure.

Here, undegreased or unsintered ceramic setter 18 is obtained when a composition containing inorganic particles (such as metal oxide particles), a binder ingredient and water is shaped into a sheet and dried.

Specifically, setter 18 is obtained when raw material paste prepared in the above-described preparation step is shaped into a sheet and dried, for example. Setter 18 may also be a disc that is obtained when a body formed in the above-described forming step is cut into sections and dried.

As a positioning step of yet another embodiment, it is an option to coat paste containing granules and a liquid medium on a base where a setter is placed, and then to position a body on the paste, the same as the positioning step in the second embodiment. Moreover, as a positioning step of yet another embodiment, it is an option to place granules (to spread them, for example) without anything else, and to position a body on the granules.

Ceramic Honeycomb Structural Body

A ceramic honeycomb structure according to an embodiment of the present invention is obtained by a manufacturing method that includes the following: a preparation step for preparing raw material paste by kneading titania particles, alumina particles and a binder ingredient; a forming step to form a body by shaping the raw material paste into a honeycomb structure; a positioning step for positioning a body on a base with granules existing between the body and the base; and a sintering step to obtain a ceramic honeycomb structure by sintering a body with granules existing between the body and a base.

When an element analysis is performed on the obtained ceramic body using a scanning electron microscope (S-4800, Hitachi, Ltd.) and an energy dispersive X-ray spectrometer (EMAX Energy EX-250, Horiba, Ltd.), the ratio (weight ratio) of titania and alumina in a ceramic body is preferred to be in a range of 7:10~4:10, more preferably 6:10~5:10.

In addition, it is preferred that titania be contained at 15 wt. %~50 wt. % and alumina at 45 wt. %~70 wt. % of the entire weight of the obtained ceramic body; more preferably, titania at 22 wt. %~40 wt. % and alumina at 55 wt. %~65 wt. %. Furthermore, it is an option for silica to be contained at 1 wt. %~20 wt. % or 3 wt. %~15 wt. % of the entire weight of the obtained ceramic body.

Partitions of a ceramic honeycomb structural body can function as a filter to capture particulate matter (PM).

Therefore, a ceramic honeycomb structure can function, for example, as a diesel particulate filter (DPF) or the like.

EXAMPLES

The present invention is further described in detail by the following examples. However, the present invention is not limited to such examples.

Example 1

Eight parts by weight of titania particles with a mean volume particle diameter of 12 μm (brand name TiO$_2$ 3020 (registered mark), Kronos Incorporated), 10 parts by weight of alumina particles with a mean volume particle diameter of 3 μm (brand name Al$_2$O$_3$ RMA (registered mark), Alcan Inc.), and 40 parts by weight of water are put in a spray dryer (G8210-A, Yamato Scientific Co., Ltd.), and spray dried to form a precursor.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are put in a kneader (brand name Mix Muller, Shinto Kogyo K.K.), and kneaded to prepare raw material paste.

The raw material paste is extruded through a honeycomb die to form a honeycomb structural body having approximately 300 cpsi (approximately 46.5 cell/cm$^2$) with a partition thickness of approximately 0.010 inch (approximately 0.25 mm). The raw material paste is shaped into a body with a diameter of 143.8 mm and a length of 150 mm.

Then, a body is cut to a desired length and dried for 20 minutes using both microwave (2.45 GHz, 20 kW) and hot air (140° C., air speed of 1 m/s).

Next, sealant slurry is prepared from the same raw material paste as used for the honeycomb body.

Masking films are put on both end surfaces of the dried body. Then, the masking films are bored into a checkered pattern so that the ceramic honeycomb structural body obtained after sintering is sealed in checkered patterns which are complementary on one end surface and on the other end surface of the ceramic body. Accordingly, a masked body is formed. As for masking film, tape with an adhesive layer (adhesive force of 5.3 N/cm) made by forming acrylic adhesive on a polyester base is used.

The portion from an end sealed with masking film to a point 5 mm upward in a longitudinal direction of a dried body is immersed into sealant slurry. Then, the body is lifted from the sealant slurry. In the same manner, the other end of the body in a longitudinal direction is also immersed into the sealant slurry and lifted from the sealant slurry. Accordingly, a sealed body is obtained.

Next, a resin sheet (thickness=700 μm) is prepared, in which zirconia particles (mean volume particle diameter=200 amount=50 wt. %) are dispersed in polyimide resin. The resin sheet is placed on a base, and a sealed body is positioned vertically on the resin sheet.

A sealed body positioned on a base with a resin sheet in between is heated under atmospheric air from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, a ceramic honeycomb structural body is obtained to have a mean pore diameter of 15 p.m. During that time, the resin ingredients of the resin sheet are burned by the heat from degreasing, leaving zirconia particles remaining between the body and the base.

An element analysis is performed on the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found in a range of 6:10~5:10.

Example 2

Paste is prepared by kneading 50 parts by weight of zirconia particles (mean volume particle diameter=30 μm), 50 parts by weight of water and a small amount of a resin thickener (cellulose type) to adjust viscosity.

Instead of a resin sheet, the prepared paste is coated on a base, and a sealed body is positioned vertically on the coated paste film. Except that degreasing and sintering are conducted under such conditions, the rest of the procedure is the same as in Example 1. Accordingly, a ceramic honeycomb structural body is obtained. When conducting degreasing and sintering, the moisture content of the paste evaporates by the heat from degreasing, leaving zirconia particles between the body and the base.

Example 3

When raw material paste is extruded through a honeycomb die to form a body in Example 1, part of the body is cut into sections to obtain a 30 mm-thick disc. Such a disc is dried for 20 minutes using both microwave (2.45 GHz, 20 kW) and hot air (140° C., air speed of 1 m/s) to form a setter.

The obtained setter is placed on a base, and a resin sheet used in Example 1 is further placed on the setter, and a sealed body is positioned vertically on the resin sheet. Except that degreasing and sintering are conducted under such conditions, the rest of the procedure is the same as in Example 1. Accordingly, a ceramic honeycomb structural body is obtained.

Comparative Example 1

A sealed body is positioned vertically directly on a base without a resin sheet. Except that degreasing and sintering are conducted under such conditions, the rest of the procedure is the same as in Example 1. Accordingly, a ceramic honeycomb structural body is obtained.

Evaluation

The difference in outer diameters at both ends in a longitudinal direction is checked in ceramic bodies obtained in Examples 1-3 and Comparative Example 1. As a result, the difference in outer diameters is 0.4 mm in Example 1, 0.5 mm in Example 2 and 0.3 mm in Example 3. It is 3.5 mm in Comparative Example 1, causing cracks.

Based on such result, it is found that the difference in outer diameters at both ends in a longitudinal direction of ceramic bodies is smaller in Examples 1-3 than in Comparative Example 1. In addition, it is found that the difference in outer diameters at both ends in a longitudinal direction of a ceramic body obtained in Examples 3 is smaller than that of ceramic bodies in Examples 1 and 2.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:
   kneading titania particles, alumina particles and a binder ingredient such that a raw material paste comprising the titania particles, the alumina particles and the binder ingredient is prepared;
   forming a body comprising the raw material paste and having a honeycomb structure such that the body has the honeycomb structure having a plurality of through-holes extending in a longitudinal direction of the body and a plurality of partition portions formed between the through-holes;
   positioning on a base having granules the body comprising the raw material paste and having the honeycomb structure such that one end surface of the body in the longitudinal direction faces the base and the granules are interposed between the base and the one end surface of the body; and
   sintering the body comprising the raw material paste and having the honeycomb structure on the base with the granules interposed between the body and the base such that a ceramic body having the honeycomb structure is formed on the base with the granules,
   wherein the granules are interposed between the base and the one end surface of the body such that the granules make contact with the base and the one end surface of the body and form a space between the base and the one end surface of the body.

2. The method for manufacturing a ceramic honeycomb structure according to claim 1, wherein the granules are zirconia granules.

3. The method for manufacturing a ceramic honeycomb structure according to claim 1, wherein the granules have a mean volume particle diameter which is set greater than a mean pore diameter of the ceramic body having the honeycomb structure.

4. The method for manufacturing a ceramic honeycomb structure according to claim 1, wherein the positioning of the body comprises placing between the body and the base an organic sheet having the granules.

5. The method for manufacturing a ceramic honeycomb structure according to claim 1, wherein the positioning of the body comprises placing between the body and the base a paste material comprising the granules and a liquid medium.

6. The method for manufacturing a ceramic honeycomb structure according to claim 1, wherein the positioning of the body includes placing an undegreased ceramic setter on the base and placing the granules on the undegreased ceramic setter such that the granules are interposed between the body and the undegreased ceramic setter.

7. The method for manufacturing a ceramic honeycomb structure according to claim 1, wherein the positioning of the body includes placing an unsintered ceramic setter on the base and placing the granules on the unsintered ceramic setter such that the granules are interposed between the body and the unsintered ceramic setter.

8. The method for manufacturing a ceramic honeycomb structure according to claim 1, further comprising drying the body comprising the raw material paste and having the honeycomb structure.

9. The method for manufacturing a ceramic honeycomb structure according to claim 1, further comprising applying a sealant to one end of each of the through-holes of the body in the longitudinal direction such that each of the through-holes of the body is sealed at the one end.

10. The method for manufacturing a ceramic honeycomb structure according to claim 1, further comprising degreasing the body comprising the raw material paste and having the honeycomb structure such that an organic ingredient in the raw material paste of the body is removed.

11. The method for manufacturing a ceramic honeycomb structure according to claim 1, further comprising degreasing the body comprising the raw material paste and having the honeycomb structure on the base such that the granules are interposed between the body and the base and an organic ingredient in the raw material paste of the body is removed.

12. The method for manufacturing a ceramic honeycomb structure according to claim 1, further comprising forming a precursor comprising particles comprising titania particles and alumina particles, wherein the kneading comprises kneading the binder ingredient and the particles of the precursor comprising the titania particles and the alumina particles.

13. The method for manufacturing a ceramic honeycomb structure according to claim 11, wherein the forming of the precursor comprises spray-drying the alumina particles onto the titania particles.

14. The method for manufacturing a ceramic honeycomb structure according to claim 1, wherein the granules have a mean volume particle diameter in a range of 25 μm~500 μm.

15. The method for manufacturing a ceramic honeycomb structure according to claim 1, wherein the granules have a mean volume particle diameter in a range of 50 μm~400 μm.

16. The method for manufacturing a ceramic honeycomb structure according to claim 1, wherein the granules have a mean volume particle diameter in a range of 100 μm~300 μm.

* * * * *